United States Patent
Lin et al.

(10) Patent No.: US 7,977,435 B2
(45) Date of Patent: Jul. 12, 2011

(54) PROPYLENE POLYMER COMPOSITIONS AND PROCESSES FOR MAKING THE SAME

(76) Inventors: Chon-Yie Lin, Houston, TX (US); Stephen Francis Broadbent, Houston, TX (US)

( * ) Notice: Subject to any disclaimer, the term of this patent is extended or adjusted under 35 U.S.C. 154(b) by 1040 days.

(21) Appl. No.: 11/485,227

(22) Filed: Jul. 12, 2006

(65) Prior Publication Data

US 2008/0015316 A1    Jan. 17, 2008

(51) Int. Cl.
*C08F 2/00* (2006.01)
*C08F 4/72* (2006.01)
*C08F 4/44* (2006.01)
*C08F 4/06* (2006.01)
*B01J 31/00* (2006.01)

(52) U.S. Cl. .... 526/65; 526/112; 526/124.6; 526/124.9; 526/125.3; 526/126; 526/128; 502/116; 502/158

(58) Field of Classification Search .............. 526/65, 526/125.3, 348.4, 348.6, 126, 128; 525/53, 525/240

See application file for complete search history.

(56) References Cited

U.S. PATENT DOCUMENTS

| | | | | |
|---|---|---|---|---|
| 4,950,720 A | * | 8/1990 | Randall et al. | 525/322 |
| 5,652,303 A | | 7/1997 | Ishimaru et al. | 526/125.3 |
| 5,986,008 A | * | 11/1999 | Matsunaga et al. | 525/240 |
| 6,087,459 A | * | 7/2000 | Miro et al. | 526/128 |
| 6,111,039 A | | 8/2000 | Miro et al. | 526/128 |
| 6,207,750 B1 | | 3/2001 | Lin et al. | 525/53 |
| 6,313,227 B1 | | 11/2001 | Tanaka et al. | 525/240 |
| 6,320,009 B1 | | 11/2001 | Nakano et al. | 526/351 |
| 6,403,708 B2 | | 6/2002 | Moriya et al. | 525/88 |
| 6,476,173 B1 | | 11/2002 | Lin et al. | 526/351 |
| 6,566,294 B2 | * | 5/2003 | Miro | 502/125 |
| 6,576,306 B2 | | 6/2003 | Mehta et al. | 428/35.5 |
| 6,583,227 B2 | | 6/2003 | Mehta et al. | 525/240 |
| 6,686,433 B1 | | 2/2004 | Miro et al. | |
| 6,733,898 B2 | | 5/2004 | Kim et al. | |
| 6,784,269 B2 | | 8/2004 | Lin et al. | 526/348.1 |
| 6,806,316 B2 | | 10/2004 | Mehta et al. | 525/240 |
| 2003/0149196 A1 | * | 8/2003 | Streeky et al. | 526/86 |
| 2004/0210012 A1 | * | 10/2004 | Jaaskelainen et al. | 526/65 |
| 2005/0245698 A1 | * | 11/2005 | Li et al. | 526/125.3 |

FOREIGN PATENT DOCUMENTS

| | | |
|---|---|---|
| EP | 0 854 156 | 7/1998 |
| EP | 0 923 618 | 6/1999 |
| EP | 1 078 009 | 2/2001 |
| JP | 3296605 | 6/1994 |
| JP | 2000063419 A * | 2/2000 |
| WO | 03/106512 | 12/2003 |

OTHER PUBLICATIONS

Translation of JP 2000063419 A.*

* cited by examiner

*Primary Examiner* — David Wu
*Assistant Examiner* — Elizabeth Eng

(57) ABSTRACT

Provided are a propylene polymer compositions comprising a propylene copolymer and a propylene homopolymer polymerized in the presence of the propylene copolymer. The propylene polymer compositions exhibit properties such as broad molecular weight distribution, low crystallinity, high solubles and superior crystallization kinetics and are useful in fast cycle-time processing methods such as injection molding, sheet extrusion, thermoforming, and oriented film fabrication. Also provided is a process for preparing the propylene polymer compositions in the presence of a catalyst and at least two electron donors using sequential or parallel polymerization reaction zones. Finally, articles made from the propylene polymer composition are provided, particularly articles requiring high stiffness, high heat deflection temperature, good fatigue resistance and low temperature impact resistance such as appliance parts.

13 Claims, 1 Drawing Sheet

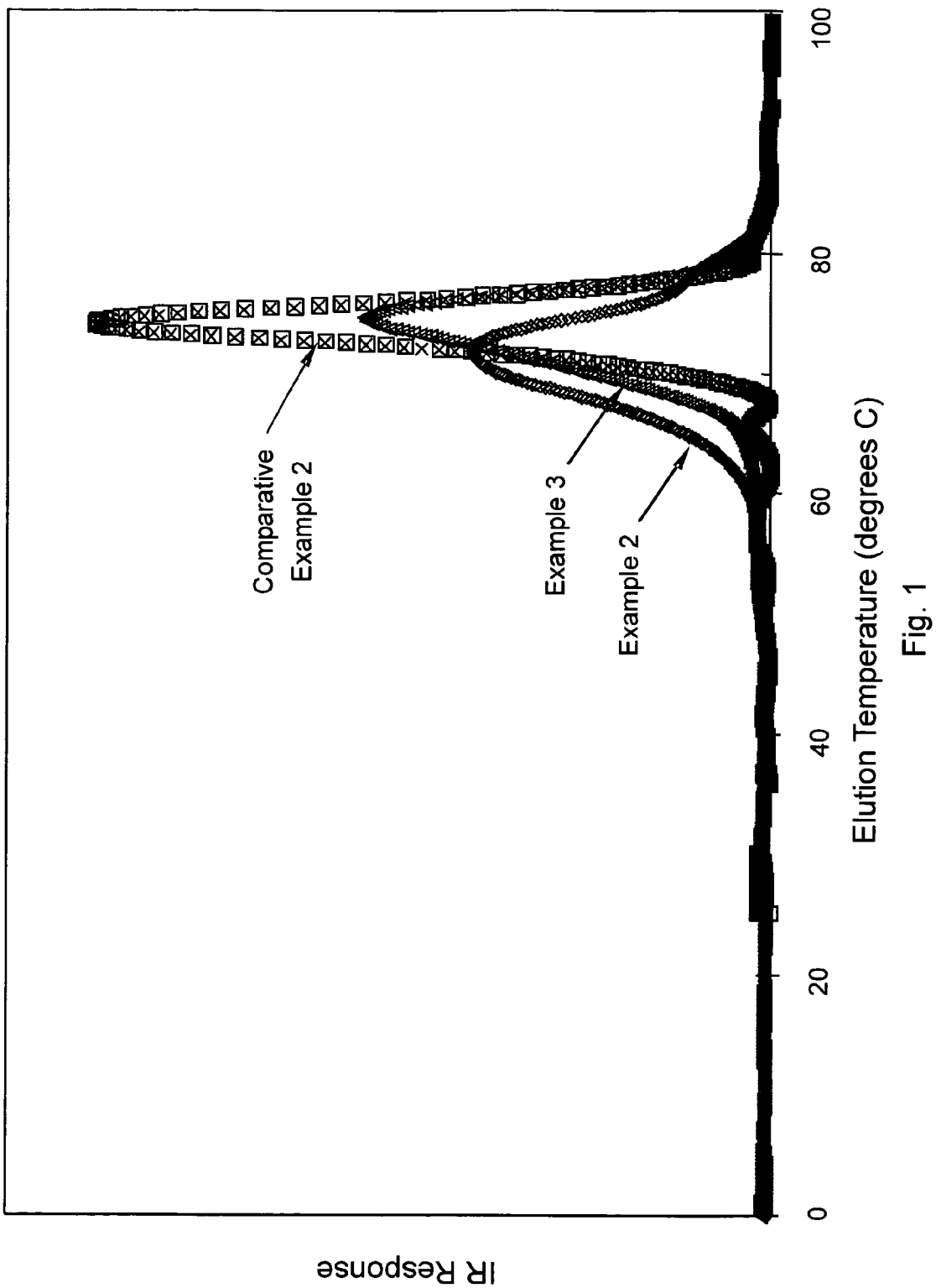

PROPYLENE POLYMER COMPOSITIONS AND PROCESSES FOR MAKING THE SAME

FIELD OF THE INVENTION

The present invention relates to propylene polymer compositions with unique properties and a process for making the same. In particular, the invention relates to propylene polymer compositions comprising an in-situ reactor blend of homopolypropylene and a copolymer of propylene and an alpha olefin comonomer. In another aspect, the invention relates to a polymerization process for production of an intimate, in-situ blend of propylene homopolymer and propylene-alpha olefin copolymer in the presence of a catalyst and at least two electron donors.

BACKGROUND OF THE INVENTION

Over the last several decades, propylene polymers have become of great importance in several end use applications. From packaging for consumer goods to automotive components, propylene polymers have demonstrated wide applicability. Useful propylene polymers may generally be produced using Ziegler-Natta catalysts comprising 1) a solid titanium catalyst component consisting of a titanium compound, a magnesium compound, and an internal electron donor, 2) a co-catalyst such as an organoaluminum compound, and 3) external electron donors. The art is full of attempts of variations and specific combinations of the aforementioned catalyst components. The art has recognized that such variations and combinations are both unpredictable but advantageously influential on copolymer properties. Therefore, the discovery of more variations and combinations of external electron donors, among other components, to accompany solid titanium catalyst has been of great benefit to improving the efficiency of the catalyst systems and the control of the polymer properties.

For example, external electron donors are used to control the stereoregularity and form of the polymer. Although a broad range of compounds are known generally as electron donors, a particular catalyst may have a specific compound or combinations of compounds with which it is especially compatible. Discovery of an appropriate type of electron donor can lead to significant improvements in the properties of the polymer such as molecular weight distribution and melt flow rate. Discovery of specific combinations of electron donors for solid titanium based supported catalysts that would provide beneficial results would be highly advantageous in certain applications.

The present invention fulfills this need by providing for propylene polymers and polymerization processes including a mixture of at least two electron donors, such as tetraethoxysilane ("TEOS"), methylcyclohexyldimethoxysilane ("MCMS"), propyltrimethoxysilane ("PTMS"), propyltriethoxysilane ("PTES"), methyltrimethoxysilane ("MTMS"), dimethyldimethoxysilane ("DMDMS") and dicyclopentyldimethoxysilane ("DCPMS") in combination with a solid titanium catalyst system. Such combinations advantageously provide for a better balance of propylene polymer properties as can be observed, for example, through broad molecular weight distributions, high xylene solubles and fast crystallization kinetics.

SUMMARY OF THE INVENTION

One aspect of the present invention provides a propylene polymer composition comprising an intimate, in-situ mixture of propylene homopolymer and a copolymer of propylene and ethylene, where the propylene polymer composition exhibits melt flow rate ("MFR") of from 2 to 15 dg/min, xylene solubles of 5 wt % or more, melting temperature ("$T_m$") less than or equal to 160° C., crystallization temperature ("$T_c$") greater than 112° C., crystallization half time ("$C_{1/2T}$") less than or equal to 270 seconds, molecular weight distribution ("MWD") of from 6 to 10, degree of composition dispersion ($\sigma_{dis}$) of from 3.5° C. to 7.5° C. and heat deflection temperature ("HDT") of from 80° C. to 110° C. The propylene polymer composition of the present invention may be processed further to form useful articles, including, but not limited to, appliance parts.

The propylene polymer compositions of the present invention have a unique combination of broad molecular weight distribution, broad composition distribution, high solubles and fast crystallization rate. The broad molecular weight results in an advantageously better melt flowability for injection molding with fewer tendencies to flow mark and fast mold filling. The high soluble, as the result of broad composition distribution, acts as internal lubricant to enhance the fatigue resistance of fabricated articles for end-use such as agitators used in washing machine and dishwasher. The fast crystallization rate is beneficial to fast cycle-time for fabrications such as injection molding and thermoforming.

Another aspect of the present invention provides a process for producing a propylene polymer comprising the steps of (1) contacting a catalyst, at least two electron donors, propylene monomer and a comonomer (ethylene or $C_4$ to $C_{10}$ alpha olefins) in a first reaction zone, (2) polymerizing the propylene monomer and comonomer in the first reaction zone to form a propylene copolymer, (3) transferring a portion of a first reaction zone effluent comprising propylene copolymer, catalyst and at least one electron donor to a second reaction zone, (4) introducing additional propylene monomer to the first reaction zone effluent in the second reaction zone, (5) polymerizing propylene monomer in the second reaction zone to form a propylene homopolymer in the second reaction zone; and recovering a propylene polymer composition from the second reaction zone.

BRIEF DESCRIPTION OF THE DRAWINGS

FIG. 1 is a composition distribution graph (derived from TREF data, described below) of the polymers produced in Examples 2 and 3 (described below) and Comparative Example 2 (also described below).

DETAILED DESCRIPTION

As used herein, the new numbering scheme for the Periodic Table of Elements Groups are used as in Hawley's Condensed Chemical Dictionary 852 (John Wiley & Sons, 13th ed. 1997).

As used herein, unless specified otherwise, the term "polypropylene copolymer(s)" or "propylene copolymer(s)" refers to copolymers, terpolymers, tetrapolymers, etc. made from at least one propylene derived unit and at least one non-propylene derived monomer unit.

As used herein, when a polymer is referred to as comprising a monomer, the monomer is present in the polymer in the polymerized form of the monomer or in the derivative form of the monomer. Likewise, when catalyst systems are said to comprise catalyst components, it is well understood by one skilled in the art, that the catalyst system comprises the catalyst system component as present in the catalyst system or in the catalyst system component's derived form.

As used herein, unless differentiated, "polymerization" includes homopolymerization, copolymerization, terpolymerization, and interpolymerization.

As used herein, "crystalline" is defined as having identifiable peak melting points above about 100° C. as determined by Differential Scanning Calorimetry (DSC peak melting temperatures).

As used herein, "isotactic" is defined as having at least 40% isotactic pentads according to analysis by $^{13}$C-NMR as disclosed in EP 0 747 212.

As used herein, "molecular weight" means weight average molecular weight ("Mw"). Molecular Weight Distribution ("MWD") means Mw divided by number average molecular weight ("Mn"). (For more information, see U.S. Pat. No. 4,540,753 to Cozewith et al. and references cited therein, and in Verstrate et al., 21 Macromolecules 3360 (1998)). The "Mz" value is the high average molecular weight value, calculated as discussed by A. R. Cooper in Concise Encyclopedia of Polymer Science and Engineering 638-39 (J. I. Kroschwitz, ed. John Wiley & Sons 1990).

Electron donors are typically used in two ways in the formation of a catalyst system. First, an internal electron donor may be used in the formation reaction of the solid catalyst. Examples of internal electron donors include: amines, amides, ethers, esters, aromatic esters, ketones, nitriles, phosphines, stibines, arsines, phosphoramides, thioethers, thioesters, aldehydes, alcoholates, and salts of organic acids.

The second use for an electron donor in a catalyst system is as an external electron donor and stereoregulator in the polymerization reaction. The same compound may be used in both instances, although typically they are different. A common external electron donor is an organic silicon compound, for example, tetraethoxysilane. A description of the two types of electron donors is provided in U.S. Pat. No. 4,535,068.

Embodiments of the invention relate particularly to external electron donors; the term "electron donor" as used herein refers to the external donor. In some embodiments, the external electron donor acts as a stereoregulator to control the amount of atactic form of polymer produced. It may also increase the production of isotactic polymers. Organic silicon compounds are generally known in the art for use as electron donors. Examples of electron donors that are organic silicon (or "silane") compounds are disclosed in U.S. Pat. Nos. 4,218,339; 4,395,360; 4,328,122; 4,473,660; 6,133,385; and 6,127,303.

Polymerization Process

In an embodiment, the invention provides a process for production of an intimate, in-situ blend of propylene homopolymer and propylene-alpha olefin copolymer. As used herein, "in-situ blend" refers to an in reactor blend in which at least one component of the blend is polymerized in the presence polymer particles of at least one other component of the blend. The polymer compositions of this invention are generally prepared in a multiple stage process wherein homopolymerization and copolymerization are conducted separately in parallel or, preferably, in series. The process begins with contacting a catalyst, at least two electron donors, propylene monomer and at least one comonomer selected from ethylene and $C_4$ to $C_{10}$ alpha olefins in a first reaction zone. The propylene monomer and comonomer are polymerized in the first reaction zone to form a propylene copolymer and at least a portion of effluent from the first reaction zone is transferred to a second reaction zone. The first reaction zone effluent contains at least some propylene copolymer made in the first reaction zone, some catalyst and at least one electron donor. Additional propylene monomer is introduced into the second reaction zone. Propylene monomers are polymerized in the second reaction zone to form a propylene homopolymer. The propylene homopolymer is polymerized in the presence of propylene copolymer so that the homo- and copolymers form an intimate, in-situ blend. The blend is then recovered from the second reaction zone. Preferably, the blend comprises from 0.5 to 7.5 wt % comonomer relative to the total weight of the polymer blend, more preferably from 0.5 to 5 wt % and more preferably 0.5 to 2.5 wt %.

In an embodiment, the catalyst used in the process of the invention is a Ziegler-Natta-type solid catalyst for the polymerization of olefins, preferably a Ziegler-Natta-type solid titanium catalyst. In one embodiment, the solid catalyst is a supported catalyst, preferably a magnesium compound supported $TiCl_4$ catalyst.

The method of polymerizing olefins in the presence of Ziegler-Natta-type catalysts is well known in the art, and is discussed, for example, in *Concise Encyclopedia of Polymer Science and Engineering*, 1087-1107 (Jacqueline I. Kroschwitz ed., 1990) and by F. A. Cotton & G. Wilkinson, *Advanced Inorganic Chemistry*, 1280-1282 (4th ed. 1980). Typical solid magnesium supported catalyst systems and preparations thereof are outlined in U.S. Pat. Nos. 4,990,479 and 5,159,021, and WO 00/44795. Briefly, the Ziegler-Natta catalyst can be obtained by: (1) suspending a dialkoxy magnesium compound in an aromatic hydrocarbon that is liquid at ambient temperatures; (2) contacting the dialkoxy magnesium hydrocarbon composition with a titanium halide and with a diester of an aromatic dicarboxylic acid; and (3) contacting the resulting functionalized dialkoxy magnesium hydrocarbon composition of step (2) with additional titanium halide. For example, Ziegler-Natta catalysts are typically composed of a transition metal compound from groups 4 through 7 and an organometallic compound of a metal from groups 11 through 13 of the periodic table. Well-known examples include TiCl3-Et2AlCl, AlR3-TiCl4 wherein Et is an ethyl group and R represents an alkyl group. These catalysts include mixtures of halides of transition metals, especially titanium, chromium, vanadium, and zirconium, with organic derivatives of nontransition metals, particularly alkyl aluminum compounds. A particularly suitable solid catalyst component for use in the present invention is sold by TOHO Titanium Company, Ltd. under the tradename THC-C-133. Such a catalyst is used as an example only, other supported titanium catalyst systems are contemplated.

In another embodiment, a co-catalyst may be used in conjunction with the catalyst. The co-catalyst is preferably an organoaluminum compound. In an embodiment, the organoaluminum compound should be halogen-free. Suitable halogen-free organoaluminum compounds are, in particular, branched, unsubstituted alkylaluminum compounds of the formula AlR3, wherein R denotes an alkyl radical having 1 to 10 carbon atoms, such as for example, trimethylaluminum, triethylaluminum, triisobutylaluminum, and tridiisobutylaluminum. Further suitable compounds are readily available and amply disclosed in the prior art including U.S. Pat. No. 4,990,477.

In an embodiment, the electron donors are preferably silane compounds, including, but not limited to, diaminodialkoxysilanes, tetraalkoxysilanes, or trialkylalkoxysilanes. In other embodiments, the at least two electron donors may comprise, for example, bis(perhydroisoquinolino)dimethoxysilane ("BPIQ"), tetraethoxysilane ("TEOS"), methylcyclohexyldimethoxysilane ("MCMS"), propyltrimethoxysilane ("PTMS"), propyltriethoxysilane ("PTES"), methyltrimethoxysilane ("MTMS"), dimethyldimethoxysilane ("DM- DMS"), dicyclopentyldimethoxysilane ("DCPMS"), or mixtures thereof. Preferably, the at least two electron donors are PTES and DCPMS.

In an embodiment, the electron donors are present in a concentration of from 1 to 15 ppm by weight ("wppm"), alternatively from 2 to 12 wppm, alternatively from 3 to 10 wppm, alternatively from 4 to 8 wppm based on the total weight of the reaction mixture.

Polymerization techniques according to the present invention can be solution polymerization, slurry polymerization or gas phase polymerization techniques. Methods and apparatus for effecting such polymerization reactions are well known. Polymerization processes of the present invention may employ solution, fixed-bed, moving-bed, fluid-bed, gas phase, slurry phase, and high pressure processes, or combinations thereof, and be conducted in single, series, or parallel reactors. In certain embodiments, particularly preferred continuous processes include diluent slurry, bulk slurry (loop and stirred tank), and gas phase (stirred and fluid bed). When two or more reactors are operating in a continuous process, the multiple reactors can be all of the same type or they may be any combination of the types.

In another embodiment, the polymerization process of the present invention may also include a batch polymerization process.

In one embodiment, the processes of the invention are directed toward a slurry or gas phase polymerization process of propylene and one or more olefin monomers selected from ethylene and $C_4$-$C_{10}$ alpha olefins. In other embodiments, the invention is particularly well suited to the polymerization of propylene and ethylene, butene-1, pentene-1, 4-methyl-pentene-1, hexene-1, octene-1, decene-1, 7-methyl-1-6-octadiene and 2-methyl-1-5-hexadiene.

In yet another embodiment, propylene is polymerized with at least two different comonomers, optionally one of which may be a diene, to form a terpolymer.

The reactor pressure in a gas phase process may vary from about 100 psig (0.690 MPa) to about 500 psig (3.448 MPa), preferably in the range of from about 200 psig (1.379 MPa) to about 400 psig (2.759 MPa), more preferably in the range of from about 250 psig (1.724 MPa) to about 350 psig (2.414 MPa).

The reactor temperature in the gas phase process may vary from about 30° C. to about 120° C., preferably from about 60° C. to about 115° C., more preferably in the range of from about 70° C. to 110° C., and most preferably in the range of from about 70° C. to about 95° C.

In another embodiment, a slurry polymerization process is employed. Such a process generally uses pressures in the range of from about 14.7 psig (0.101 MPa) to about 735 psig (5.1 MPa) and even greater and temperatures in the range of 0° C. to about 120° C. In a preferred embodiment, the polymerization process uses pressures in the range of from about 338 psig (2.3 MPa) to about 559 psig (3.9 MPa), more preferably from about 353 psig (2.4 MPa) to about 470 psig (3.2 MPa) and temperatures in the range of 57° C. to about 77° C., more preferably from about 58° C. to about 74° C. In a slurry polymerization, a suspension of solid, particulate polymer is formed in liquid propylene to which ethylene and comonomers and often hydrogen along with catalyst are added. The suspension including monomer is intermittently or continuously removed from the reactor where the volatile components are separated from the polymer and recycled, optionally after a distillation, to the reactor. The propylene should be liquid under the conditions of polymerization.

A preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179. Other slurry processes include those employing one or more loop reactors and those utilizing one or more stirred reactors in series, parallel, or combinations thereof. Non-limiting examples of slurry processes include continuous loop or stirred tank processes. Also, other examples of slurry processes are described in U.S. Pat. No. 4,613,484.

Polymer Compositions

Although the invention provides processes suitable to polymerize propylene and many comonomers, a preferred embodiment is directed to the production of propylene polymer compositions comprising propylene homopolymer and propylene-ethylene copolymer. The propylene polymer compositions of the present invention are reactor (or in-situ) blends. As a result, the homopolymer and copolymer are in intimate contact with each other in the polymer composition. A desirable feature of this composition is the presence of high molecular weight comonomer, to selectively reduce the crystallinity and improve toughness of fabricated products, while the high crystallinity homopolymer provides desirable properties such as stiffness, high heat deflection temperature and fast solidification during article fabrication. In other embodiments, the invention is particularly well suited to the polymerization of propylene with other comonomers, including, but not limited to butene-1, pentene-1, 4-methyl-pentene-1, hexene-1, octene-1, decene-1, 7-methyl-1-6-octadiene and 2-methyl-1-5-hexadiene.

In an embodiment, the polymer compositions of the invention have a crystallization temperature ($T_c$) of at least 112° C., more preferably at least 112.5° C., more preferably at least 113° C., more preferably at least 113.5° C. and even more preferably at least 114° C.

In an embodiment, the polymer compositions of the present invention have a crystallization half time ($C_{1/2T}$) at 123° C. of less than 270 seconds, more preferably less than 240 seconds, more preferably less than 210 seconds, more preferably less than 195 seconds, even more preferably less than 180 seconds.

In an embodiment, the polymer compositions, are characterized by MWDs in the range of from 6.0 to 10.0, alternatively from 6.0 to 9.5, alternatively from 6.0 to 9.0.

In an embodiment, the polymer compositions have a melt flow rate (MFR) in the range of from 2 to 35 dg/min, alternatively from 5 to 30 dg/min, alternatively from 5 to 20 dg/min, alternatively from 5 to 15 dg/min, alternatively 5 to 10 dg/min.

In an embodiment, the polymer compositions have a melting point ($T_m$) less than or equal to 160° C., preferably less than 159° C., more preferably less than 158° C. and even more preferably less than 157° C.

In an embodiment, the polymer compositions have a xylene solubles content of at least 5 wt %, more preferably at least 5.5 wt %, more preferably at least 6.0 wt %, more preferably at least 6.5 wt %, more preferably at least 7.0 wt % and even more preferably at least 8 wt %.

In an embodiment, the polymer compositions have a n-heptane insolubles content of less than 95%, preferably less than 94.5%, more preferably less than 94%, and even more preferably less than 93.5%.

In an embodiment, the polymer compositions of the invention have a 1% secant flexural modulus of from 500 MPa (73 kpsi) to 2000 MPa (290 kpsi), depending on the melt flow rate (MFR) of the polymer. More preferably, the polymer compositions of the invention provide a 1% secant flexural modulus of from 600 MPa (87 kpsi) to 1900 MPa (276 kpsi), more preferably of from 700 MPa (102 kpsi) to 1800 MPa (261 kpsi) and even more preferably of from 800 MPa (116 kpsi) to 1700 MPa (247 kpsi).

In an embodiment, the polymer compositions exhibit a heat deflection temperature ("HDT") at 0.4551 MPa (66 psi) of from 80° C. to 110° C., or from 85° C. to 105° C., or from 90° C. to 105° C., or from 90° C. to 100° C.

In an embodiment, the polymer compositions exhibit notched IZOD impact strength at 23° C. of from 16 J/m to 60 J/m, preferably of from 25 J/m to 60 J/m, more preferably of from 30 J/m to 60, even more preferably of from 35 J/m to 60 J/m.

In another embodiment, the polymer compositions exhibit an unnotched IZOD impact strength at −18° C. of from 100 to 160 J/m, preferably of from 110 J/m to 160 J/m, more preferably of from 120 J/m to 160, more preferably of from 130 J/m to 160 J/m and even more preferably of from 135 J/m to 160 J/m.

In an embodiment, the polymer compositions exhibit an isotatic pentad portion of less 97%, more preferably less than 96%, more preferably less than 95%, even more preferably less than 94%. The isotactic content of the polymer can be characterized approximately by means of the insolubles fraction of the polymer in n-heptane. Usually, a Soxhlet extraction with boiling n-heptane is carried out for a time in the range from 8 to 24 hours. The isotactic content (measured in percent) is the ratio of the weight of the dried n-heptane-insolubles fraction to the starting sample weight.

In other embodiments, the polymer compositions exhibit degrees of composition dispersion ($\sigma_{dis}$) of from 3.5° C. to 7.5° C., alternatively of from 4.0° C. to 7.0° C., alternatively 4.5° C. to 6.5° C. or alternatively of from 5.0° C. to 6.0° C.

In some embodiments of the invention, the polymer compositions may be combined with one or more other polymers, including but not limited to, thermoplastic polymer(s) and/or elastomer(s) blended through conventional methods well-known in the art. Additionally, the polymers of the invention may also be functionalized by methods also well known in the art.

The polymer compositions of the present invention may also be combined with conventional additives to form additional polymer compositions using materials and methods well-known in the art. Those additives include adjuvants, oils, plasticizers, block, antiblock, color masterbatches, processing aids, neutralizers, lubricants, waxes, antioxidants, nucleating agents, acid scavengers, stabilizers, surfactants, anticorrosion agents, cavitating agents, blowing agents, quenchers, antistatic agents, slip agents, pigments, dyes, fillers, cure agents, UV absorbers, chain breaking agents such as peroxide. The additives may be present in the typically effective amounts well known in the art, such as from 0.001 wt % to 10 wt %.

INDUSTRIAL APPLICABILITY

The inventive propylene polymer compositions of the invention are extremely useful for fibers, fabrics, injection molded articles, compression molded articles, thermoformed articles, blow molded articles, extruded articles, solid phase formed articles, laminates, composites, and films.

The inventive copolymers can be used over a wide range of end-product applications. Non-limiting examples of desirable articles of manufacture made from the compositions of the invention include films, sheets, fibers, woven and non-woven fabrics, tubes, pipes, automotive components, furniture, sporting equipment, food storage containers, transparent and semi-transparent articles, toys, appliance components, and medical devices.

The inventive polymer compositions can be utilized neat, or in combination with other polymers. For example, the inventive polymers could be used as one layer in a coextruded film structure.

Test Methods

Melt Flow Rate: MFR was measured according to ASTM D1238 test method, at 230° C. and 2.16 kg load, and is expressed as dg/min or g/10 min.

Melting Temperature and Crystallization Temperature: The melting temperature ($T_m$) and crystallization temperature ($T_c$) were determined by differential scanning calorimetry (DSC). For example, the method proceeds as follows. From 6 to 10 mg of a sheet of the polypropylene polymer is pressed at approximately 200° C. to 230° C. and is removed with a punch die. The sample is sealed in an aluminum pan and loaded into the differential scanning calorimeter (Perkin Elmer 7 Series Thermal Analysis System) at room temperature. The sample is then heated at a rate of 10° C./min to a final temperature of 200° C. and is then held for 10 minutes at this temperature to destroy its thermal history. Crystallization data is acquired by cooling the sample from the melt to at least 50° C. below the crystallization temperature at a cooling rate of 10° C./min. The sample is then held for 10 minutes and finally heated at 10° C./min to acquire melting data (second heat). This provides information about the melting behavior after a controlled thermal history and free from potential molded-in orientation and stress effects. The endothermic melting transition and exothermic crystallization transition are analyzed for onset of transition and peak temperature. The melting temperature reported in the tables are the peak melting temperatures from the second heat unless otherwise indicated.

Crystallization Half-time: The crystallization half-time ($C_{1/2T}$) was determined by differential scanning calorimetry ("DSC"). Using the same sample preparation method as for melting temperature and crystallization temperature determination, the sample is heated at a rate of 10° C./min to a final temperature of 200° C. and is then held for 10 minutes at this temperature to destroy its thermal history. The sample is then cooled from 200° C. to 145° C. at a rapid cooling rate of 150° C./min and is then cooled from 145° C. to 123° C. at a cooling rate of 40° C./min. The sample is held at 123° C. for 45 minutes to measure the isothermal crystallization half-time. The crystallization half time is determine by the duration of time from the onset to reach 50% of total area under the curve of exothermic crystallization transition.

Mechanical Properties: Test specimens for mechanical property testing were injection-molded, unless otherwise specified. The testing temperature was standard laboratory temperature (23±2° C.) as specified in ASTM D618, unless otherwise specified. Instron load frames were used for tensile and flexure testing.

Tensile Properties: Tensile properties were determined according to ASTM D638, including yield stress (also called tensile strength at yield) and yield strain (also called elongation at yield). Injection-molded tensile bars were ASTM D638 Type I tested at a speed of 50.8 mm/min.

Flexure Properties: Flexure property of 1% secant modulus was determined according to ASTM D790A. Test specimen geometry is specified under "Molding Materials (Thermoplastics and Thermosets)", and the support span was 50.8 mm.

Heat Deflection Temperature: Heat deflection temperature was determined according to ASTM D648 at 0.4551 MPa (66 psi) and 1.82 MPa (264 psi) on injection-molded specimens.

Rockwell Hardness: Rockwell hardness was determined according to ASTM D785, using the R-scale.

Impact Properties: Izod impact resistance is determined according to ASTM D256, at the specified temperature. A TMI Izod Impact Tester was used. Specimens are cut individually from the center portion of injection-molded ASTM D638 Type I tensile bars. The notch is oriented such that the impact occurs on the notched side of the specimen (following Procedure A of ASTM D256) for notched impact testing. The notch orientation is reversed (following Procedure E of ASTM D256) for unnotched impact testing. All specimens are assigned a thickness of 3.1 mm for calculation of the impact resistance. All breaks were complete, unless specified otherwise.

n-Heptane Extraction: One method to determine the amount of crystalline, isotactic material is by the insolubles remaining after refluxing n-heptane extraction. The Soxhlet extraction apparatus consists of a 400 ml Soxhlet extractor, with a widened overflow tube (to prevent siphoning and to provide constant flow extraction); a metal screen cage fitted inside the main Soxhlet chamber; a Soxhlet extraction thimble (Whatman, single thickness, cellulose) placed inside the screen cage; a condenser with cooling water and drain; and a one-neck 1000 ml round bottom flask with appropriately sized stir bar and heating mantle. The procedure was as follows. Dry the Soxhlet thimbles in a 95° C. oven for approximately 60 minutes. Weigh the dry thimble directly after removal from oven; record this weight as A: Thimble Weight Before, in grams. Weigh out 15-20 grams of sample (either in pellet or ground pellet form) into the thimble; record as B: Polymer Weight, in grams. Place the thimble containing the polymer in the Soxhlet apparatus. Pour about 300 ml of HPLC-grade n-heptane into the round bottom flask with stir bar and secure the flask on the heating mantle. Connect the round bottom flask, the soxhlet, and the condenser in series. Pour more n-heptane down through the center of the condenser into the Soxhlet main chamber until the solvent level is just below the top of the overflow tube. Turn on the cooling water to the condenser. Turn on the heating mantle and adjust the setting to generate a rolling boil in the round bottom flask and maintain a good reflux. Allow to reflux for 16 hours. Turn the heat off but leave the cooling system on. Allow the system to cool down to room temperature. Disassemble the apparatus. Remove the thimble and rinse with a small amount of fresh n-heptane. Allow to air dry in the laboratory hood, followed by oven drying at 95° C. for 90 minutes. Weigh the thimble containing the polymer directly after removal from oven; record as C: Polymer/Thimble Weight After, in grams. The quantity of insolubles is determined by calculating the weight loss from the sample, W=(C−A), in grams. The insolubles level, E, in weight percent, is then calculated by E=100*(W/B).

Xylene Solubles: The amount of low molecular weight and/or amorphous material is determined by solubility in xylene at 135° C. The procedure was as follows. Weigh out 2 grams of sample (either in pellet or ground pellet form) into 300 ml conical flask. Pour 200 ml of xylene into the conical flask with stir bar and secure the flask on a heating oil bath. Turn on the heating oil bath and allow melting of the polymer by leaving the flask in oil bath at 135° C. for about 15 minutes. When melted, discontinue heating, but continue stirring through the cooling process. Allow the dissolved polymer to cool spontaneously overnight. The precipitate is filtered with Teflon filter paper and then dried under vacuum at 90° C. The quantity of xylene soluble is determined by calculating the percent by weight of total polymer sample ("A") less precipitate ("B") at room temperature [soluble content =((A−B)/A)× 100].

Size-Exclusion Chromatography of Polymers: Molecular weight distribution is characterized using Size-Exclusion Chromatography ("SEC"). Molecular weights (weight-average molecular weight and number-average molecular weight) are determined using a High Temperature Size Exclusion Chromatograph (either from Waters Corporation or Polymer Laboratories), equipped with a differential refractive index detector ("DRI"), an online light scattering detector, and a viscometer. Experimental details not described below, including how the detectors are calibrated, are described in: T. Sun, P. Brant, R. R. Chance, and W. W. Graessley, I, *Macromolecules*, Volume 34, Number 19, 6812-6820, (2001). Three Polymer Laboratories PLgel 10 mm Mixed-B columns are used. The nominal flow rate is 0.5 cm³/min, and the nominal injection volume was 300 µL. The various transfer lines, columns and differential refractometer (the DRI detector) are contained in an oven maintained at 135° C. Solvent for the SEC experiment is prepared by dissolving 6 grams of butylated hydroxytoluene as an antioxidant in 4 liters of Aldrich reagent grade 1,2,4 trichlorobenzene ("TCB"). The TCB mixture is then filtered through a 0.7 µm glass pre-filter and subsequently through a 0.1 µm Teflon filter. The TCB is then degassed with an online degasser before entering the SEC. Polymer solutions are prepared by placing dry polymer in a glass container, adding the desired amount of TCB, then heating the mixture at 160° C. with continuous agitation for about 2 hours. All quantities are measured gravimetrically. The TCB densities used to express the polymer concentration in mass/volume units are 1.463 g/ml at room temperature and 1.324 g/ml at 135° C. The injection concentration ranged from 1.0 to 2.0 mg/ml, with lower concentrations being used for higher molecular weight samples. Prior to running each sample the DRI detector and the injector are purged. Flow rate in the apparatus is then increased to 0.5 ml/minute, and the DRI is allowed to stabilize for 8-9 hours before injecting the first sample. The LS™ laser is turned on 1 to 1.5 hours before running samples. The concentration, c, at each point in the chromatogram is calculated from the baseline-subtracted DRI signal, $I_{DRI}$, using the following equation:

$$c = K_{DRI} I_{DRI} / (dn/dc)$$

where $K_{DRI}$ is a constant determined by calibrating the DRI, and (dn/dc) is the same as described below for the LS analysis. Units on parameters throughout this description of the SEC method are such that concentration is expressed in g/cm³, molecular weight is expressed in g/mole, and intrinsic viscosity is expressed in dL/g. The light scattering detector used is a Wyatt Technology High Temperature mini-DAWN. The polymer molecular weight, M, at each point in the chromatogram is determined by analyzing the LS output using the Zimm model for static light scattering (M.B. Huglin, LIGHT SCATTERING FROM POLYMER SOLUTIONS, Academic Press, 1971):

$$\frac{K_o c}{\Delta R(\theta)} = \frac{1}{M P(\theta)} + 2 A_c c$$

Here, $\Delta R(\theta)$ is the measured excess Rayleigh scattering intensity at scattering angle $\theta$, c is the polymer concentration determined from the DRI analysis, $A_2$ is the second virial coefficient, $P(\theta)$ is the form factor for a monodisperse random coil (described in the above reference), and $K_o$ is the optical constant for the system:

$$K_o = \frac{4\pi^2 n^2 (dn/dc)^2}{\lambda^4 N_A}$$

in which $N_A$ is Avogadro's number, and (dn/dc) is the refractive index increment for the system. The refractive index, n=1.500 for TCB at 135° C. and λ=690 nm. In addition, $A_2$=0.0006 for propylene polymers and 0.0015 for butene polymers, and (dn/dc)=0.104 for propylene polymers and 0.098 for butene polymers. A high temperature Viscotek Corporation viscometer is used, which has four capillaries arranged in a Wheatstone bridge configuration with two pressure transducers. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, $[\eta]$, at each point in the chromatogram is calculated from the following equation:

$$\eta_s = c[\eta] + 0.3(c[\eta])^2$$

where c was determined from the DRI output.

Crystallization Analysis Fractionation ("CRYSTAF"): Crystallization analysis fractionation is a method to determine the composition distribution curves. The method involves dissolving a polymer sample in a solvent at high temperature, then cooling the solution slowly to cause fractionation of the sample based on solubility. For semi-crystalline samples, including blends, solubility depends primarily on crystallizability: portions of the sample that are more crystalline will precipitate out of solution at a higher temperature than portions of the sample that are less crystalline. The relative amount of sample in solution as a function of temperature is measured using an infrared detector to obtain the cumulative solubility distribution. A commercial CRYSTAF 200 instrument (Polymer Char S. A., Valencia, Spain) with five stirred stainless steel vessels of 60 mL volume was used to perform the test. Approximately 30 mg of sample were dissolved for 60 min at 160° C. in 30 mL of 1,2-dichlorobenzene that was stabilized with 2 g/4 L of butylated hydroxytoluene. The solution was then stabilized for 45 min at 100° C. The crystallization was carried out from 100° C. to 30° C. at a crystallization rate of 0.2° C./min. A dual wavelength infrared detector with a heated flow through cell maintained at 150° C. was used to measure the polymer concentration in solution at regular intervals during the crystallization cycle; the measuring wavelength was 3.5 µm and the reference wavelength was 3.6 µm. A graph (composition distribution curve) is then drawn on the basis of the crystallization quantity, and the crystallization temperature is obtained and the compositional distribution of the polymer can be determined. The degree of composition dispersion ($\sigma_{dis}$), measured in degrees, is determined by the temperature difference between the temperature ($T_{90}$) when the cumulative solubility of the polymer in solution is 90% and the temperature ($T_{50}$) when the cumulative solubility of the polymer in solution is 50%, as represented by the following formula:

$$\sigma_{dis} = T_{90} - T_{50}$$

Comonomer Content: Comonomer content is determined by Fourier Transform Infrared Spectroscopy (FTIR) measurements (calibrated versus $^{13}$C NMR). The comonomer contents, expressed as percentages by weight, are based on the total weight of the propylene and ethylene-derived units; i.e., based on the sum of weight percent propylene-derived units and weight percent ethylene-derived units being 100%. The ethylene composition of a polymer with less than 4.0 weight percent can be measured as follows. A thin homogeneous film is pressed at a temperature of about 150° C. or greater, then mounted on a Bio-Rad FTS-575C infrared spectrometer. A full spectrum of the sample from 600 cm$^{-1}$ to 4000 cm$^{-1}$ is recorded and the monomer weight percent of ethylene can be calculated according to the following equation:

$$\text{Ethylene wt\%} = 82.585 - 111.987X + 30.045X^2$$

Wherein X is the ratio of the peak height at 1155 cm$^{-1}$ to the peak height at the higher of either 722 cm$^{-1}$ or 732 cm$^{-1}$. The concentration of other monomers in the polymer can also be measured using this method. The ethylene composition of a polymer with equal more than 4.0 weight percent can be measured as follows. A thin homogeneous film is pressed at a temperature of about 150° C. or greater, then mounted on a Perkin Elmer Spectrum 2000 infrared spectrometer. A full spectrum of the sample from 450 cm$^{-1}$ to 4500 cm$^{-1}$ is recorded and the monomer weight percent of ethylene can be calculated according to the following equation:

$$\text{Ethylene wt\%} = 73.492 - 89.298Y + 15.637Y^2$$

Wherein $Y = AR/(AR+1)$ and AR is the ratio of the peak area at 1155 cm$^{-1}$ to the peak area at 732 cm$^{-1}$.

In yet other embodiments, the present invention includes:

A. A polymer composition comprising propylene and from 0.5 to 7.5 wt % comonomer selected from ethylene and $C_4$ to $C_{10}$ alpha olefins, where the polymer exhibits:
   MFR of from 2 to 10 dg/min;
   xylene solubles at least of 5 wt %;
   $T_m$ less than or equal to 160° C.;
   $T_c$ of at least 112° C.;
   $C_{1/2T}$ less than 270 seconds;
   MWD of from 6 to 10;
   $\sigma_{dis}$ of from 3.5° C. to 7.5° C.; and
   HDT of from 80° C. to 110° C.

B. The polymer composition of embodiment A, wherein the polymer exhibits a n-heptane insolubles of less than 95%.

C. The polymer composition of any of the previous embodiments comprising of from 0.5 wt % to 5.0 wt % comonomer or alternatively 0.5 wt % to 2.5 wt % comonomer.

D. The polymer composition of any of the previous embodiments, wherein the comonomer is selected from ethylene, butene-1, pentene-1, 4-methyl-pentene-1, hexane-1, octene-1, decene-1, 7-methyl-1-6-octadiene and 2-methyl-1-5-hexadiene.

E. The polymer composition of any of the previous embodiments, wherein the comonomer is two different comonomers.

F. The polymer composition of any of the previous embodiments, wherein the $T_c$ is at least 112.5° C., alternatively at least 113° C. or alternatively at least 114° C.

G. The polymer composition of any of the previous embodiments, wherein the $T_m$ is less than or equal to 159° C. or alternatively less than or equal to 158° C.

H. The polymer composition of any of the previous embodiments, wherein the $C_{1/2T}$ is less than 240 seconds, alternatively less than 210 seconds or alternatively less than 195 seconds.

I. The polymer composition of any of the previous embodiments, wherein the $\sigma_{dis}$ is from 4.0° C. to 7.0° C., alternatively from 4.5° C. to 6.5° C. or alternatively from 5.0° C. to 6.0° C.

J. The polymer composition of any of the previous embodiments, wherein the polymer composition exhibits a 1% secant flexural modulus of from 500 MPa to 2000 MPa.

K. The polymer composition of any of the previous embodiments, wherein the polymer composition exhibits a notched IZOD impact strength at 23° C. of from 16 J/m to 60 J/m, alternatively of from 25 J/m to 60 J/m, or alternatively of from 30 J/m to 60 J/m.

L. The polymer composition of embodiment 1, wherein the polymer composition exhibits an unnotched IZOD impact strength at −18° C. of from 100 J/m to 160 J/m, alternatively of from 120 J/m to 160 J/m, or alternatively of from 130 J/m to 160 J/m.

M. A molded article comprising the polymer composition of any of the previous embodiments.

N. The molded article of embodiment M, wherein the molded article comprises an appliance component, automotive component, food storage container or sporting equipment component.

O. An in-situ polymer composition comprising a propylene copolymer comprising from 1.0 to 7.5 wt % comonomer selected from ethylene and $C_4$ to $C_{10}$ alpha olefins, and propylene homopolymer, wherein the in-situ polymer composition comprises from 0.5 to 5.0 wt % comonomer, where the polymer exhibits:
  MFR of from 2 to 10 dg/min;
  xylene solubles at least of 5 wt %;
  $T_m$ less than or equal to 160° C.;
  $T_c$ of at least 112° C.;
  $C_{1/2T}$ less than 270 seconds;
  MWD of from 6 to 10;
  $\sigma_{dis}$ of from 3.5° C. to 7.5° C.; and
  HDT of from 80° C. to 110° C.
P. The in-situ polymer composition of embodiment O, wherein the in-situ polymer composition exhibits a n-heptane insolubles of less than 95%.
Q. The in-situ polymer composition of any of embodiments O-P, wherein the propylene copolymer is present in the amount of at least 45 wt % or alternatively at least 50 wt %.
R. The in-situ polymer composition of any of embodiments O-Q, wherein the comonomer is selected from ethylene, butene-1, pentene-1, 4-methyl-pentene-1, hexane-1, octene-1, decene-1, 7-methyl-1-6-octadiene and 2-methyl-1-5-hexadiene.
S. The in-situ polymer composition of any of embodiments O-R, wherein the comonomer is two different comonomers.
T. The in-situ polymer composition of any of embodiments O-S, wherein the propylene copolymer exhibits MFR less than 1 dg/min.
U. The in-situ polymer composition of any of embodiments O-T, wherein the $\sigma_{dis}$ is from 4.0° C. to 7.0° C., alternatively from 4.5° C. to 6.5° C. or alternatively from 5.0° C. to 6.0° C.
V. The in-situ polymer composition of any of embodiments O-U, wherein the polymer exhibits a notched IZOD impact strength at 23° C. of from 25 J/m to 60 J/m or alternatively of from 30 J/m to 60 J/m.
W. The in-situ polymer composition of any of embodiments O-V, wherein the polymer exhibits an unnotched IZOD impact strength at −18° C. of from 120 J/m to 160 J/m or alternatively of from 130 J/m to 160 J/m.
X. A molded article comprising the in-situ polymer composition of any of embodiments O-W.
Y. The molded article of embodiment X, wherein the molded article comprises an appliance component, automotive component, food storage container or sporting equipment component.
Z. A process for producing a propylene polymer composition comprising:
  contacting a catalyst, at least two electron donors, propylene monomer and a comonomer selected from ethylene and $C_4$ to $C_{10}$ alpha olefins in a first reaction zone;
  polymerizing the propylene monomer and the comonomer in the first reaction zone to form a propylene copolymer;
  transferring at least a portion of a first reaction zone effluent comprising propylene copolymer, catalyst and at least one electron donor to a second reaction zone;
  introducing additional propylene monomer to the first reaction zone effluent in the second reaction zone;
  polymerizing propylene monomer in the second reaction zone to form a propylene homopolymer in the second reaction zone; and
  recovering from the second reaction zone a propylene polymer composition comprising from 0.5 to 7.5 wt % comonomer and exhibiting:
    MFR of from 2 to 10 dg/min;
    xylene solubles of at least of 5 wt %;
    $C_{1/2T}$ less than or equal to 270 seconds;
    MWD of from 6 to 10;
    $\sigma_{dis}$ of from 3.5° C. to 7.5° C.;
    $T_m$ less than or equal to 160° C.; and
    $T_c$ greater than 112° C.
AA. The process of embodiment Z, wherein the catalyst is a Group 4 to Group 7 transition metal catalyst.
BB. The process of any of embodiments Z-AA, wherein the catalyst is a Ziegler-Natta catalyst.
CC. The process of any of embodiments Z-BB, wherein the catalyst comprises titanium.
DD. The process of any of embodiments Z-CC, further comprising a catalyst support.
EE. The process of embodiment DD, wherein the catalyst support comprises magnesium dichloride.
FF. The process of any of embodiments Z-EE, further comprising: introducing a co-catalyst to the first reaction zone.
GG. The process of any of embodiments FF, wherein the co-catalyst is a Group 11 to Group 13 organometallic compound.
HH. The process of any of embodiments FF-GG, wherein the co-catalyst is an organoaluminum compound.
II. The process of any of embodiments FF-HH, wherein the co-catalyst is halogen-free.
JJ. The process of any of embodiments FF-II, wherein the co-catalyst is represented by the formula AlR3, wherein R is a C1 to C10 alkyl radical.
KK. The process of any of embodiments HH-JJ, wherein the organoaluminum compound is selected from trimethylaluminum, triethylaluminum, triisobutylaluminum, and tridiisobutylaluminum.
LL. The process of any of embodiments Z-KK, wherein the at least two electron donors are independently selected from diaminodialkoxysilanes, tetraalkoxysilanes and trialkylalkoxysilanes.
MM. The process of any of embodiments Z-LL, wherein the at least two electron donors are independently selected from the group consisting of tetraethoxysilane ("TEOS"), methylcyclohexyldimethoxysilane ("MCMS"), propyltrimethoxysilane ("PTMS"), propyltriethoxysilane ("PTES"), methyltrimethoxysilane ("MTMS"), dimethyldimethoxysilane ("DMDMS") and dicyclopentyldimethoxysilane ("DCPMS").
NN. The process of any of embodiments Z-MM, wherein the at least two electron donors are propyltriethoxysilane and dicyclopentyldimethoxysilane.
OO. The process of any of embodiments Z-NN, wherein the at least two electron donors are present in the amount of from 1 wppm to 15 wppm, alternatively of from 3 wppm to 10 wppm or alternatively of from 4 wppm to 8 wppm.
PP. The process of any of embodiments Z-OO, wherein the propylene polymer composition comprises at least 40 wt % propylene copolymer, alternatively at least 45 wt % propylene copolymer or alternatively at least 50 wt % propylene copolymer.
QQ. The process of any of embodiments Z-PP, wherein the comonomer is selected from ethylene, butene-1, pentene-1, 4-methyl-pentene-1, hexane-1, octene-1, decene-1, 7-methyl-1-6-octadiene and 2-methyl-1-5-hexadiene.
RR. The process of any of embodiments Z-QQ, wherein the comonomer is two different comonomers.
SS. The process of any of embodiments Z-RR, wherein the first and second reaction zones are independently selected from slurry polymerization zones, solution polymerization zones and gas phase polymerization zones.
TT. The process of any of embodiments Z-SS, wherein the propylene polymer composition exhibits a notched IZOD impact strength at 23° C. of from 25 J/m to 60 J/m or alternatively of from 30 J/m to 60 J/m.
UU. The process of any of embodiments Z-TT, wherein the propylene polymer composition exhibits an unnotched IZOD impact strength at −18° C. of from 120 J/m to 160 J/m or alternatively of from 130 J/m to 160 J/m.

VV. The process of any of embodiments Z-UU, further comprising: molding the propylene polymer composition to form a molded article.

WW. The process of embodiment VV, wherein the molded article comprises an appliance component, automotive component, food storage container or sporting equipment component.

The above description is intended to be illustrative of the invention, but should not be considered limiting. Persons skilled in the art will recognize that various modifications may be made without departing from the spirit and scope of the invention. Accordingly, the invention will be deemed to include all such modifications that fall within the appended claims and their equivalents.

EXAMPLES

Example 1

The procedure for polymerizing polymer compostions of example 1 was as follows. The polymerization was conducted in a pilot scale continuous loop liquid phase polymerization process employing two reaction zones (comprising one reactor each) in series. The reactors were equipped with jackets for removing the heat of polymerization. The reactor temperature was set at 70° C. in both the first reaction zone and second reaction zone. The catalyst, which was oil slurried, (10 parts by weight catalyst to 90 parts by weight Drakeol™ 35 available from Penreco, Dickinson, Tex.) for ease of addition to the reaction zone. Catalyst in 10 wt% slurry, was fed at an estimated rate of 5 ml/hr. Triethylaluminum ("TEAL") was employed as scavenger and was fed as 2 wt% concentration in hexane solvent at a rate of 3.8 ml/min. A blend of two electron donors, the blend comprising about 5 mol% of DCPMS and 95 mol% of PTES based on total mol% of electron donors, was fed in hexane solution as 0.072 wt% concentration into the reactor at a feed rate of 4.6 ml/min to attain the donor concentrations of 3.9 wppm based on total wppm of donors in propylene. Propylene was fed at a rate of about 28.6 kg/hr to the first reaction zone and about 30.4 kg/hr in the second reaction zone. Ethylene comonomer was added only to the first reaction zone at a feed rate as needed to result in an overall targeted incorporation of ethylene concentration at about 1.2 wt% in the final polymer. Hydrogen was added for molecular weight control at about 117 mppm in the first reaction zone and about 4200 mppm in the second reaction zone, such that the first reaction zone polymer's MFR was about 0.7 dg/min and the second reacton zone polymer's MFR was about 5.2 dg/min. Residence times were about 67.5 minutes in the first reaction zone and 22.5 minutes in the second reaction zone. The production split was 52 wt% in the first reaction zone and 48 wt% in the second reaction zone. The production rate of polymer was about 22.7 kg/hr. After the end of the polymerization, the monomer is vaporized in a dryer to obtain the resultant propylene polymer composition.

Example 2

The polymer, example 2, was prepared using the same catalyst and polymerization procedure as described above for example 1. The differences were an increase in electron donor feed to 4.0 wppm based on total wppm of donors in propylene, adjustment of hydrogen feed rates such that the first reaction zone polymer's MFR was about 1.0 dg/min and the second reaction zone polymer's MFR was about 6.8 dg/min, and the production split was 49% in the first reaction zone and 51% in the second reaction zone.

Example 3

The polymer, example 3, was prepared using the same catalyst and polymerization procedure as described above for example 1. The only differences were an increase in electron donor feed to 9.1 wppm based on total wppm of donors in propylene, adjustment of hydrogen feed rates such that the first reaction zone polymer's MFR was about 0.9 dg/min and the second reaction zone polymer's MFR was about 6.1 dg/min, and the production split was 45% in the first reaction zone and 55% in the second reaction zone.

Example 4

The polymer, example 4, was prepared using the same catalyst and polymerization procedure as described above for example 1. The only differences were an increase in electron donor feed to 10.5 wppm based on total wppm of donors in propylene, an increase in ethylene feed to result in an overall targeted incorporation of ethylene concentration at about 1.3 wt % in the final polymer, adjustment of hydrogen feed rates such that the first reaction zone polymer's MFR was about 0.7 dg/min and the second reaction zone polymer's MFR was about 6.4 dg/min, and the production split was 41% in the first reaction zone and 59% in the second reaction zone.

A summary of polymerization conditions for Examples 1 through 4 is provided in Table 1.

Following the polymerization, the polymer compositions of the present invention were blended in a tumble blender with a commercially available additive package, including 1500 ppm of IRGANOX® 1010, 600 ppm of calcium stearate and 3600 ppm of DSTDP (distearyl thiodipropionate), to achieve a homogeneous mixture. The blended polymer compositions were compounded and pelletized using a 30 mm twin screw extruder at an extrusion temperature of 230° C.

COMPARATIVE EXAMPLES

Comparative Example 1

The polymer is a commercial product available from ExxonMobil Chemical Company (PP1052). It is a polypropylene homopolymer with a melt flow rate of 5.3 dg/min.

Comparative Example 2

The polymer is a commercial product available from ExxonMobil Chemical Company (PP4712E1). It is a reactor blend of polypropylene homopolymer and propylene/ethylene copolymer with a melt flow rate of 2.8 dg/min and an ethylene content of 0.6 wt %.

The resin properties of the Comparative Examples are listed in Table 2.

The invention polymers (Examples 1 through 4) and control (Comparative Examples 1 and 2) were injection molded into ASTM test specimens. A summary of the injection molded properties for these examples is provided in Table 3.

TABLE 1

| | | Example 1 | Example 2 | Example 3 | Example 4 |
|---|---|---|---|---|---|
| 1st Reaction Zone | MFR (dg/min) | 0.7 | 1.0 | 0.9 | 0.7 |
| | wt % C2= | 2.3 | 2.4 | 2.7 | 3.2 |
| | Donor (wppm) | 3.9 | 4.0 | 9.1 | 10.5 |
| | Production Split | 52% | 49% | 45% | 41% |
| 2nd Reaction Zone | MFR (dg/min) | 5.2 | 6.8 | 6.1 | 6.4 |
| | wt % C2= | 1.2 | 1.2 | 1.2 | 1.3 |
| | Production Split | 48% | 51% | 55% | 59% |

TABLE 2

| Resin Properties | Example 1 | Example 2 | Example 3 | Example 4 | Comparative Example 1 | Comparative Example 2 |
|---|---|---|---|---|---|---|
| MFR | 5.2 | 6.8 | 6.1 | 6.4 | 5.3 | 2.8 |
| wt % C2= | 1.2 | 1.2 | 1.2 | 1.3 | 0 | 0.6 |
| MWD | 9.0 | 6.9 | 8.9 | 6.3 | 6.2 | 6.7 |
| $\sigma_{dis}$ (° C.) | 4.6 | 6.2 | 4.0 | 4.5 | — | 2.8 |
| Xylene solubles (%) | 6.8 | 8.7 | 7.0 | 5.8 | 4.4 | 3.2 |
| Heptane Insoubles (%) | 93.5 | 93.4 | 94.7 | 96.3 | 96.4 | 97.5 |
| Melt Temperature (° C.) | 156 | 156 | 157 | 157 | 161 | 160 |
| Cryst. Temperature (° C.) | 112 | 114 | 114 | 114 | 111 | 110 |
| Cryst. Half Time @ 123° C. (sec) | 186 | 195 | 184 | 150 | 261 | 406 |

TABLE 3

| | Example 1 | Example 2 | Example 3 | Example 4 | Comparative Example 1 |
|---|---|---|---|---|---|
| Tensile Strength @ Yield (MPa) | 31 | 31 | 32 | 34 | 34 |
| Elongation @ Yield (%) | 12 | 12 | 12 | 10 | 18 |
| Flexural Modulus (MPa), 1% Secant Method | 1255 | 1276 | 1351 | 1448 | 1310 |
| HDT @ 0.455 MPa (° C.) | 87 | 89 | 90 | 97 | 90 |
| @ 1.82 MPa (° C.) | 51 | 51 | 52 | 56 | 53 |
| IZOD Impact (J/m) | | | | | |
| Notched @ 23° C. (73° F.) | 33 | 33 | 30 | 27 | 32 |
| Unnotched @ −18° C. (−2° F.) | 135 | 129 | 135 | 133 | 203 |
| Unnotched @ −29° C. (−21° F.) | 138 | 140 | 132 | 143 | 203 |
| Rockwell Hardness (R-scale) | 86 | 84 | 89 | 93 | 97 |

What is claimed is:

1. A process for producing a propylene polymer composition comprising:
   (a) contacting a catalyst, at least two electron donors fed as a blend, propylene monomer and a comonomer selected from ethylene and $C_4$ to $C_{10}$ alpha olefins in a first reaction zone;
   (b) polymerizing the propylene monomer and the comonomer in the first reaction zone to form a propylene copolymer;
   (c) transferring at least a portion of a first reaction zone effluent comprising propylene copolymer, catalyst and at least one electron donor to a second reaction zone;
   (d) introducing additional propylene monomer to the first reaction zone effluent in the second reaction zone;
   (e) polymerizing propylene monomer in the second reaction zone to form a propylene homopolymer in the second reaction zone; and
   (f) recovering from the second reaction zone a propylene polymer composition comprising from 0.5 to 7.5 wt% comonomer and exhibiting:
   MFR of from 5 to 10 dg/min;
   xylene solubles of at least 5 wt%;
   $C_{1/2T}$ less than or equal to 270 seconds;
   MWD of from 6 to 10;
   $\sigma_{dis}$ of from 3.5° C. to 7.5° C.;
   $T_m$ less than or equal to 160° C.; and
   $T_c$ greater than 112° C.

2. The process of claim 1, wherein the catalyst is a Group 4 to Group 7 transition metal catalyst.

3. The process of claim 2, wherein the catalyst is a Ziegler-Natta catalyst.

4. The process of claim 3, wherein the catalyst comprises titanium.

5. The process of claim 1, further comprising: introducing a co-catalyst to the first reaction zone.

6. The process of claim 1, wherein the at least two electron donors are independently selected from diaminodialkoxysilanes, tetraalkoxysilanes and trialkylalkoxysilanes.

7. The process of claim 1, wherein the at least two electron donors are independently selected from the group consisting of tetraethoxysilane ("TEOS"), methylcyclohexyldimethoxysilane ("MCMS"), propyltrimethoxysilane ("PTMS"), propyltriethoxysilane ("PTES"), methyltrimethoxysilane ("MTMS"), dimethyldimethoxysilane ("DMDMS") and dicyclopentyldimethoxysilane ("DCPMS").

8. The process of claim 1, wherein the first and second reaction zones are independently selected from slurry polymerization zones, solution polymerization zones and gas phase polymerization zones.

9. The process of claim 1, wherein the propylene polymer composition exhibits a notched IZOD impact strength at 23° C. of from 25 J/m to 60 J/m.

10. The process of claim 1, wherein the propylene polymer composition exhibits an unnotched IZOD impact strength at −18° C. of from 120 J/m to 160 J/m.

11. The process of claim 1, wherein the at least two electron donors comprise propyltriethoxysilane ("PTES") and dicyclopentyldimethoxysilane ("DCPMS").

12. The process of claim 1, wherein the at least two electron donors are propyltriethoxysilane ("PTES") and dicyclopentyldimethoxysilane ("DCPMS").

13. The process of claim 1, wherein the at least two electron donors are 95 mol% propyltriethoxysilane ("PTES") and 5 mol% dicyclopentyldimethoxysilane ("DCPMS"), based on total mol% of electron donors.

\* \* \* \* \*